United States Patent [19]

Lenz

[11] Patent Number: 4,483,881
[45] Date of Patent: Nov. 20, 1984

[54] PROCESS FOR DISCONTINUOUS WORT BOILING DURING BEER MANUFACTURE

[76] Inventor: Bernhard Lenz, Schwarzacher Str. 51a, D-8710 Kitzingen, Fed. Rep. of Germany

[21] Appl. No.: 446,275

[22] Filed: Dec. 2, 1982

[30] Foreign Application Priority Data

Dec. 2, 1981 [DE] Fed. Rep. of Germany ....... 3147620

[51] Int. Cl.³ .......................... C12C 3/00; A23L 1/207
[52] U.S. Cl. ...................................... 426/600; 99/276; 99/278; 165/1
[58] Field of Search .................... 426/600, 520, 16, 29; 165/66, 1; 435/93, 316; 99/276, 278

[56] References Cited

U.S. PATENT DOCUMENTS 3,453,114  7/1969  Bayne et al. ...................... 426/600
4,388,857  6/1983  Korek ................................ 426/29

FOREIGN PATENT DOCUMENTS 2949918  7/1981  Fed. Rep. of Germany ........ 426/16

Primary Examiner—George Yeung
Attorney, Agent, or Firm—Jacobi Siegel Presta Marzullo & Aronson

[57] ABSTRACT

In discontinuous wort boiling for the manufacture of beer, the energy of the vapor arising from the boiling is used in a heat exchanger for the production of hot water. The heated brewing water is reheated in a second heat exchange process by the energy from the vapor arising from the boiling and, with this reheated brewing water, the refined wort is heated again in another heat exchange process before the boiling, whereby the brewing water which is cooled in this heat exchange process is reheated by the energy from the vapor arising from the boiling. Thus, the energy from the vapor produced during the wort boiling is fed directly back into the wort boiling process.

3 Claims, 1 Drawing Figure

U.S. Patent  Nov. 20, 1984  4,483,881
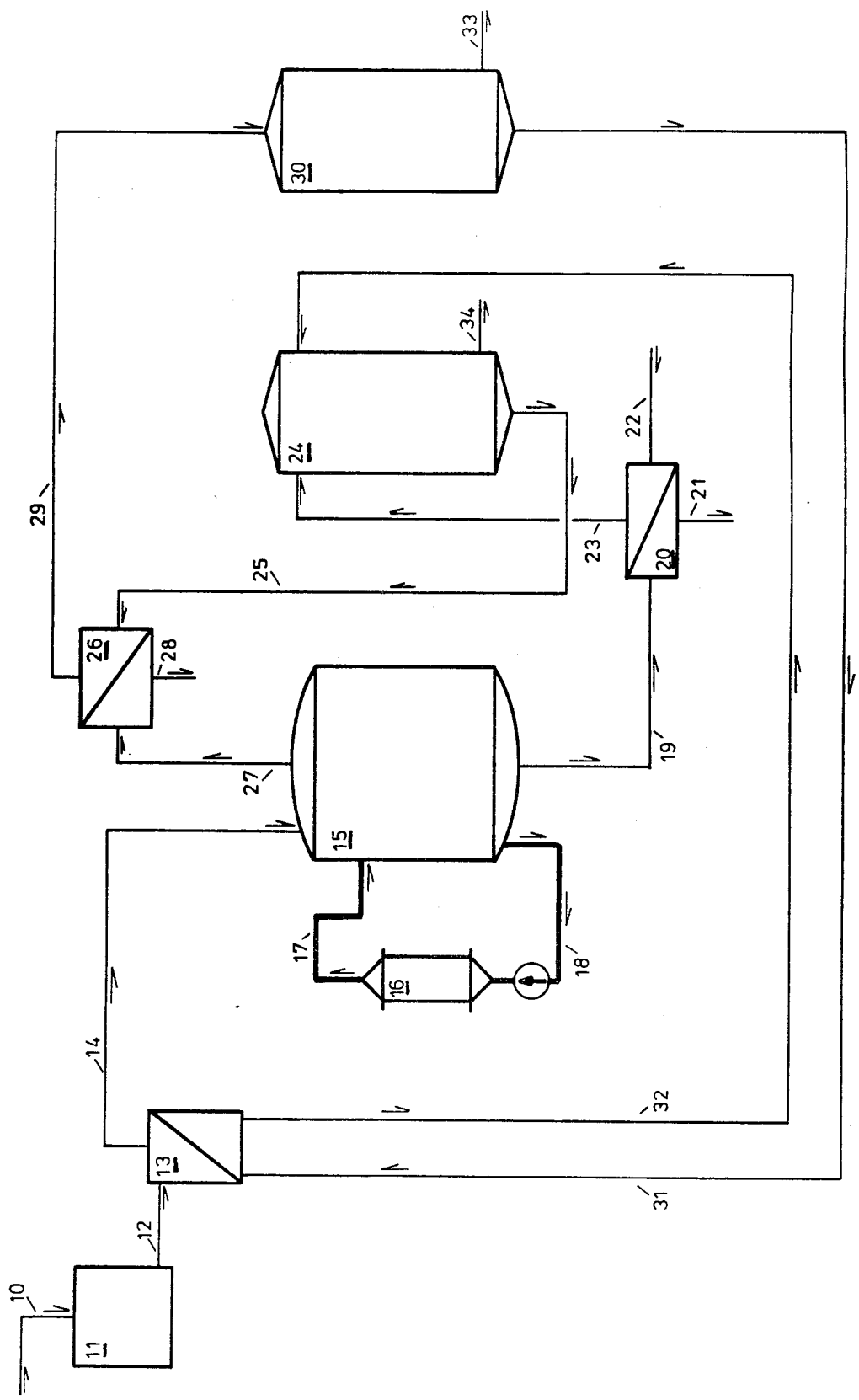

PROCESS FOR DISCONTINUOUS WORT BOILING DURING BEER MANUFACTURE

BACKGROUND OF THE INVENTION

The invention relates to a process for discontinuous boiling of wort during beer making, in which the refined wort is preferably boiled under low pressure, and after the boiling is cooled down in a first heat exchange process for subsequent use for beer making, whereby cool water is heated to the temperature of brewing water in this first heat exchange process, and whereby furthermore the energy from the vapor produced by the wort boiling is used in a second heat exchange process.

With discontinuous boiling of wort, it is known to use the energy from the vapor produced by the boiling in a heat exchanger for the production of hot water. However, excess hot water is generally produced, despite the relatively great use of hot water in a brewery. This tends to overload the primary enery producer.

With continuous wort boiling in stages, it is also known to use the vapor produced by boiling in a closed circuit for heating the individual stages in the brewing system. This system, however, uses a very large structure, and is correspondingly expensive and inflexible. Also, the high temperatures required for this impair the quality of the wort.

SUMMARY OF THE INVENTION

The object of the present invention is to improve the wort boiling process in that the heat energy from the vapor arising from the boiling is primarily fed back into the wort boiling process and secondarily, if desired, can also be used for hot water production for external use.

This is attained according to the invention in that the heated brewing water is reheated in the second heat exchange process by the energy from the vapor produced by the boiling; the refined wort, in a third heat exchange process before the boiling, is further heated by this reheated brewing water; and the brewing water cooled down in the third heat exchange process is heated in the second heat exchange process by the energy from the vapor produced by the boiling, and so on and so forth.

Thus, the energy from the vapor arising from the wort boiling is advantageously fed directly back into the wort boiling process, whereby however, if needed, brewing water heated by the energy from the vapor arising from the boiling can also be used for other purposes. Generally, with the process according to the invention, one has the advantage of the constantly circulating volume of brewing water, which is heated by the energy from the vapor arising from the boiling, and is used to reheat the refined wort before boiling. This provides a savings of primary energy during the wort boiling and a reduction to ca. 5 kg of steam per hectoliter of wort, which also advantageously allows reduction of the size of the steam boiler which supplies the steam for feed into the boiler for the wort vat. This is how the invention significantly improves the energy savings during wort boiling.

According to another feature of the invention, the brewing water heated by energy from the vapor produced by the boiling is collected in a tank in the second heat exchange process before its use in the third heat exchange process. The tank can be heat-insulated.

The hot brewing water is fed from this tank into the third heat exchange process only with a boiling process is terminated, and fresh refined wort is fed into the boiling vessel.

In one preferred process, the brewing water which is heated to ca. 78° C. in the first heat exchange process is heated to ca. 99° C. in the second heat exchange process by the energy from the vapor arising from the boiling, and the refined wort is heated to ca. 95° C. by the hot brewing water in the third heat exchange process, wherein the brewing water is cooled to ca. 78° C. This brewing water which is cooled to ca. 78° C. can advantageously be fed directly back into the brewing water tank in which the brewing water is collected (at a temperature of ca. 78° C.).

BRIEF DESCRIPTION OF THE DRAWING

The invention is explained hereinafter in greater detail relative to the drawing, which is a simplified diagram of a plant to carry out the process according to the invention.

DESCRIPTION OF THE PREFERRED EMBODIMENTS

The refined wort which is intended for the wort boiling is fed in from a clearing vat (not shown) through a pipeline 10 into a holding vessel 11. The wort in the holding vessel 11 has a temperature of ca. 70° C. A predetermined portion of the wort is fed from the holding vessel 11 through pipeline 12, heat exchanger 13 and pipeline 14 into a wort vat 15 for the boiling. Wort vat 15 is combind with an outside boiler 16, in which the circulating wort is heated to boiling. Boiler 16 is connected through pipelines 17 and 18 with the inside chamber of wort vat 15 for this purpose. After the boiling process, the hot wort is fed through pipeline 19 into heat exchanger 20, from which it is discharged at 21 as what is called cold wort to be used in the beer making. The hot wort in heat exchanger 20 is cooled by water fed into heat exchanger 20 at 22 at a temperature of ca. 10° C., which is heated to ca. 78° C. by the wort in heat exchanger 20, and can be fed through pipeline 23 into a brewing water tank 24.

The volume of hot water produced in heat exchanger 20 at ca. 78° C. is determined to coincide with the requirement for the next brewing, to avoid overproduction.

During the wort boiling process, in which pipelines 19, 22, 23 are blocked, brewing water at a temperature of ca. 78° C. is fed from tank 24 through pipeline 25 into heat exchanger 26, in which it is heated to ca. 99° C. by the heat energy of the vapor produced during the wort boiling. Heat exchanger 26 is connected for this purpose through pipeline 27 with the top of the inner chamber of wort vat 15. The vapors arising from and produced by the wort boiling, which can have a temperature of ca. 100° to 110° C., are fed from wort vat 15 through pipeline 27 into heat exchanger 26, from which the condensate from the heat exchange process is carried away at 28.

The brewing water heated to ca. 99° C. by the energy from the vapor in heat exchanger 26 produced by the boiling is fed through a pipeline 29 into a hot water tank 30. The 99° C. hot brewing water is then eollected in the tank 30.

After termination of the boiling of the contents of the wort vat 15, when the product is carried away as cold wort through pipeline 19 and heat exchanger 20, as explained above, and a new portion of refined wort is fed from holding vessel 11 into wort vat 15, then heat exchanger 13 is set into operation. The wort flowing from holding vessel 11 into pipeline 12 is at ca. 70° C., and is further heated to ca. 95° C. in heat exchanger 13, so that it can flow into wort vat 15 through pipeline 14 at this temperature. Thus, outside boiler 16 requires less fresh steam for the heating of this wort than before, and the saving of primary energy which is aimed for is attained by the steam production.

The wort is heated in heat exchanger 13 by means of the ca. 99° C. brewing water which is in hot water tank 30, which is fed through pipeline 31 into heat exchanger 13 during this phase, where it is cooled to ca. 78° C. and is discharged at this temperature from heat exchanger 13 through pipeline 32, which leads back into brewing water tank 24. A constant volume of brewing water can generally be kept in circulation in this manner. An additional feed of brewing water into brewing water tank 24 is therefore required only if hot water is drawn for other (external) reasons, e.g., drawn from hot water tank 30 at 33 or tank 24 at 34. An automatic feedback device then can start operating, so that sufficient water is always present in the system.

It is to be noted that the wort is boiled in wort vat 15 under a slight pressure, e.g., a pressure of 1 bar.

It is also to be noted that the numerous slides, valves and pumps required for the above discontinuous wort boiling are not shown in the drawing to allow it to be more easily understood.

What is claimed is:

1. In a process for discontinuous wort boiling for beer manufacture, in which refined wort is boiled under slight pressure, and after the boiling is cooled in a first heat exchange process to be reused for beer making, wherein, in the first heat exchange process, cool water is heated to a predetermined temperature, and wherein furthermore the energy of the vapor produced by the wort boiling is used in a second heat exchange process, the improvement comprising the steps of reheating the heated water in the second heat exchange process by the energy arising from the vapor produced by the boiling, heating the refined wort before boiling by the reheated water in a third heat exchange process, and further heating in the second heat exchange process the water cooled in the third heat exchange process by the energy arising from the vapor produced by the boiling.

2. The process as in claim 1, wherein water heated by the energy arising from the vapor produced by the boiling in the second heat exchange process is collected in a tank for use in the third heat exchange process.

3. The process as in claim 1, wherein water is heated to approximately 78° C. in the first heat exchange process and is heated to approximately 99° C. in the second heat exchange process by the energy from the vapor arising from the boiling, and the refined wort is heated to approximately 95° C. in the third heat exchange process by the hot water, and the water is thus cooled to approximately 78° C.

* * * * *